(12) United States Patent
Molnar et al.

(10) Patent No.: US 7,387,750 B2
(45) Date of Patent: *Jun. 17, 2008

(54) CONDUCTIVE FLUOROPOLYMERS

(75) Inventors: Attila Molnar, Vadnais Heights, MN (US); Steven R. Parsons, Oakdale, MN (US); Thomas J. Blong, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 250 days.

This patent is subject to a terminal disclaimer.

(21) Appl. No.: 10/987,777

(22) Filed: Nov. 12, 2004

(65) Prior Publication Data

US 2006/0102880 A1    May 18, 2006

Related U.S. Application Data

(62) Division of application No. 10/293,686, filed on Nov. 13, 2002, now Pat. No. 6,827,881, which is a division of application No. 09/716,806, filed on Nov. 20, 2000, now Pat. No. 6,533,955.

(51) Int. Cl.
    *H01B 1/24* (2006.01)
(52) U.S. Cl. .................... 252/511; 264/104
(58) Field of Classification Search ........... 252/511; 264/104
    See application file for complete search history.

(56) References Cited

U.S. PATENT DOCUMENTS

| 4,617,351 A | 10/1986 | Heckel, Jr. et al. |
| 4,902,444 A | 2/1990 | Kolouch |
| 5,000,875 A | 3/1991 | Kolouch |
| 5,093,409 A | 3/1992 | Buckmaster |
| 5,284,184 A | 2/1994 | Noone et al. |
| 5,524,673 A | 6/1996 | Noone et al. |
| 5,527,858 A | 6/1996 | Blong et al. |
| 5,552,199 A | 9/1996 | Blong et al. |
| 5,795,500 A | 8/1998 | Law et al. |
| 6,117,508 A | 9/2000 | Parsonage et al. |
| 6,358,438 B1 * | 3/2002 | Isozaki et al. .......... 252/511 |

FOREIGN PATENT DOCUMENTS

| EP | 0 228 777 A2 | 7/1987 |
| EP | 0 312 077 A1 | 4/1989 |
| JP | 60 199045 | 10/1985 |
| JP | 62-15244 A * | 1/1987 |
| WO | WO 96/07695 | 3/1996 |

OTHER PUBLICATIONS

Feng et al "Positive and negative temperature coefficient effects of an alternating copolymer of tetrafluoroethylene-ethylene containing carbon black filled HDPE particles", Polymer 41 (2000) 7279-7282.*

"Polymer extrusion" by Chris Rauwendaal, Hansen Publishers, pp. 23-48 (1986).

* cited by examiner

*Primary Examiner*—Mark Kopec
(74) *Attorney, Agent, or Firm*—Dena M. Ehrich; C. Michael Geise

(57) ABSTRACT

The invention provides a melt-processable conductive fluorothermoplastic composition comprising three components. The first component is at least one melt-processable, thermoplastic fluoropolymer component having its interpolymerized units derived from (i) at least 50 wt % of TFE, and (ii) one or more ethylenically-unsaturated monomers represented by the formulas (a) $CF_2=CF-R_f$, (b) $CF_2=CF-O-R_f'$, and (c) $CH_2=CR_2$. The thermoplastic fluoropolymer component is substantially free of interpolymerized units derived from VDF. The second component is from about 0.1 to about 10 weight percent of a hydrocarbon polymer, and the third component is from about 1 to about 20 weight percent of conductive filler. The invention also provides a method for making fluorothermoplastic compositions and shaped articles comprising a conductive fluorothermoplastic composition.

15 Claims, No Drawings

CONDUCTIVE FLUOROPOLYMERS

CROSS REFERENCE TO RELATED APPLICATIONS

This application is a divisional of U.S. application Ser. No. 10/293,686, filed Nov. 13, 2002, now U.S. Pat. No. 6,827,881, which is a divisional of U.S. application Ser. No. 09/716,806, filed Nov. 20, 2000, issued as U.S. Pat. No. 6,533,955, and the entirety of the disclosures of these are incorporated by reference herein.

TECHNICAL FIELD

This invention relates to electrically conductive, thermoplastic melt processable compositions that employ a major amount of a fluorothermoplastic polymer, and minor amounts of an electrically conductive material and a polyolefin.

BACKGROUND

Fluoropolymers are often used for their desirable properties, such as low surface tension, high thermal stability, and high resistance to chemicals, oils, and/or solvents.

Examples of fluoropolymers include copolymers of tetrafluoroethylene with one or more fluorinated monomers such as hexafluoropropylene or perfluoropropyl vinyl ether, and/or non-fluorinated monomers such as ethylene or propylene.

Often it is desirable that the fluoropolymer have a lower electrical resistance or even be electrically conductive. Fluoropolymers are typically made more electrically conductive by adding electrically conductive fillers (e.g., carbon black, carbon fibers, etc.). However, the addition of such fillers has certain negative effects on the properties of the fluoropolymers. For example, while adding conductive fillers desirably enhances the electrically conductivity of the fluoropolymer, it also often undesirably reduces the melt processabililty of the fluoropolymer.

DISCLOSURE OF INVENTION

The present invention provides a thermoplastic melt-processable fluoropolymer with lower electrical resistivity without increasing the level of the conductive filler. Hydrocarbon polymers, such as polyolefins, are well known in the art as electrical insulators. Surprisingly, adding a normally insulating hydrocarbon polymer to what would be a conductive composition actually improves the conductivity of the resultant mixture in this invention. The present invention also provides lower-resistivity fluoropolymers with improved processability and higher melt flow indices than known materials having comparable resistivity.

Briefly, the present invention provides a melt-processable conductive fluorothermoplastic composition comprising a blend of at least three components. The first component provides a major amount (i.e., at least 50 weight percent) of at least one melt-processable, thermoplastic fluoropolymer component. This first component has its interpolymerized units derived from (i) at least 50 weight percent (wt %) of tetrafluoroethylene (TFE), and (ii) one or more ethylenically-unsaturated monomers represented by the formulas $CF_2=CF-R_f$, $CF_2=CF-O-R_f'$, and $CH_2=CR_2$. In the preceding formulas, $R_f$ is a perfluoroalkyl of 1 to 8, preferably 1 to 3, carbon atoms, $R_f'$ is $R_f$ or a perfluoroalkoxy of 1 to 8, preferably 1 to 3, carbon atoms, and R is selected from H, F, Cl, or an aliphatic group having from 1 to 8, preferably 1 to 4, carbon atoms which aliphatic group may have F or Cl substituents. The first component has less than 5 wt % of its interpolymerized units derived from vinylidene fluoride. The second component is a hydrocarbon polymer, present in the blend at a level from about 0.1 to about 10 wt %. The third component is a conductive filler, present in the blend at a level from about 1 to about 20 wt %.

The present invention also provides a method of improving volume resistivity of a melt-processable conductive fluorothermoplastic composition comprising the steps of providing at least the three components described above, and mixing the components.

The present invention also provides shaped articles incorporating a fluorothermoplastic composition as described above.

The extrudates of the present invention substantially retain properties of the fluoropolymer, such as thermal stability and/or chemical resistance. These extrudates exhibit lower resistivity than known fluorothermoplastic compositions having similar levels of conductive fillers. More specifically, the inventive compositions have a volume resistivity below about $1 \times 10^4$ ohm cm, more preferably below about $1 \times 10^2$ ohm cm.

The lower resistivity is surprisingly achieved while maintaining good melt processability or extrusion behavior. The melt flow indices of the inventive compositions do not decrease as rapidly as known materials when the level of conductive filler is increased. Thus, the extrudates of the inventive blend composition can be extruded at higher output rates and at much higher shear rates with much reduced shear stress, as compared to known fluorothermoplastic compositions having similar resistivity levels. These inventive extrudates also have good surface qualities, particularly smoothness, and are otherwise relatively free of objectionable surface melt defects.

DETAILED DESCRIPTION

The melt-processable conductive fluorothermoplastic composition of the present invention generally has a sufficient quantity of its interpolymerized units derived from TFE to provide a desirable level of chemical resistance, while being a melt-processable thermoplastic fluoropolymer. That is, the final composition remains thermoplastic. In this thermoplastic fluoropolymer, the level of interpolymerized units derived from TFE generally ranges from about 50 wt % to about 98 wt %.

In one group of fluoropolymers useful in the present invention the melt-processable, thermoplastic fluoropolymer has interpolymerized units derived from TFE and one or more ethylenically-unsaturated monomers of the formula $CF_2=CF-R_f$, wherein $R_f$ is a perfluoroalkyl of 1 to 8, preferably 1 to 3, carbon atoms.

Typically, fluoropolymers of this group have a combination of 80 to 90 wt % (preferably 84 to 88 wt %) of their units derived from TFE. Correspondingly, the balance of the fluoropolymer is one or more ethylenically-unsaturated monomers of the formula $CF_2=CF-R_f$ (preferably hexafluoropropylene (HFP)), although it may further contain up to about 2% of one or more ethylenically-unsaturated monomers of the formula $CF_2=CF-O-R_f$ (preferably perfluoropropylvinylether). In this document, perfluoropropylvinylether (PPVE) includes $CF_2=CF-O-CF_2CF_2CF_3$ (also referred to as PPVE-1) and/or $CF_2=CF-O-CF_2CF(CF_3)OCF_2CF_2CF_3$ (also referred to as PPVE-2).

In another group of fluoropolymers useful in the present invention, the thermoplastic fluoropolymer has interpolymerized units derived from TFE and one or more ethylenically-unsaturated monomers of the formula $CF_2=CF—O—R_f'$. More specifically, fluoropolymers useful in the present invention have a combination of 85 to 98 wt % (preferably 90 to 97 wt %, more preferably 95 to 97 wt %) of their units derived from TFE. The balance of the fluoropolymer is from about 15 to about 2 wt % (preferably 10 to 3 wt %, more preferably 5 to 3 wt %) of one or more ethylenically-unsaturated monomers of the formula $CF_2=CF—O—R_f'$ (preferably PPVE), although this fluoropolymer composition may further contain up to about 6 wt % of one or more ethylenically-unsaturated monomers of the formula $CF_2=CF—R_f$ (preferably HFP).

Thus, fluoropolymers containing interpolymerized units derived from TFE and one, two, three, or more comonomer(s) are within the scope of the present invention.

Specific monomers of the formula $CF_2=CF—R_f$ useful in the present invention include $CF_2=CFCF_3$ and $CF_2=CFCF_2CF_3$.

Specific monomers of the formula $CF_2=CF—O—R_f'$ useful in the present invention include $CF_2=CF—O—CF_3$, $CF_2=CF—O—CF_2CF_3$, $CF_2=CF—O—CF_2CF_2CF_3$ (PPVE-1), $CF_2=CF—O—CF_2CF_2CF_2OCF_3$, $CF_2=CF—O—CF_2CF(CF_3)OCF_2CF_2CF_3$ (PPVE-2), and $CF_2=CF—O—CF_2CF(CF_3)OCF_2CF(CF_3)OCF_2CF_2CF_3$.

Another group of monomers useful in combination with TFE includes ethylenically-unsaturated monomers of the formula $CH_2=CR_2$. In this formula R is selected from H, F, Cl, or an aliphatic group having from 1 to 8, preferably 1 to 4, carbon atoms which may have F or Cl substituents. This group of monomers includes hydrocarbon olefins such as ethylene and propylene.

Fluoropolymers useful in the present invention also include combinations wherein the thermoplastic fluoropolymer has interpolymerized units derived from TFE, at least one ethylenically-unsaturated monomer of the formula $CH_2=CR_2$, and either one or more ethylenically-unsaturated monomer(s) of the formula $CF_2=CF—R_f$, or one or more ethylenically-unsaturated monomer(s) of the formula $CF_2=CF—O—R_f'$, or both. More specifically, this group of fluoropolymers further includes combinations wherein the thermoplastic fluoropolymer has interpolymerized units derived from TFE, an olefin such as ethylene or propylene, one or more ethylenically-unsaturated monomers of the formula $CF_2=CF—R_f$ (preferably HFP), and one or more ethylenically-unsaturated monomers of the formula $CF_2=CF—O—R_f'$ (preferably PPVE). Such fluoropolymers can have a combination of 60 to 80 wt % of their units derived from TFE and about 10 to about 25 wt % ethylene. In addition, the balance of the fluoropolymers in this group optionally includes monomers selected from up to about 30 wt % of one or more ethylenically-unsaturated monomers of the formula $CF_2=CF—R_f$ (preferably HFP), and optionally up to about 15 wt % of one or more ethylenically-unsaturated monomers of the formula $CF_2=CF—O—R_f'$ (preferably PPVE).

At least one melt-processable, thermoplastic fluoropolymer is required in the present invention. Two or more such fluoropolymers of the same or different compositions also can be used. For example, a first polymer having a low melt flow index may be used with a second polymer of the same or similar composition but having higher melt flow index than the first polymer. In addition, a fluoropolymer derived from TFE and one or more monomers having the formula $CF_2=CF—R_f$ may be used with another fluoropolymer derived from TFE and one or more monomer(s) having the formula $CF_2=CF—O—R_f'$.

In preparing the blends of this invention, those fluoropolymers substantially free of interpolymerized units derived from vinylidene fluoride (VDF) are preferred. That is, the fluoropolymers contain less than 5 wt %, more preferably less than 2 wt %, and most preferably 0 wt % of interpolymerized units derived from VDF.

Commercial fluoropolymers which can be used include copolymers of perfluorinated ethylene-propylene (FEP) such as FEP 6307, FEP 6322; copolymers of tetrafluoroethylene and perfluoropropylvinyl ether (PFA) such as PFA 6502N; copolymers of ethylene and tetrafluoroethylene (ET or ETFE) such as ET 6060, ET 6430, ET 6235J, ET 6235G; copolymers of hexafluoropropylene, tetrafluoroethylene, and ethylene (HTE) such as HTE 1500, and HTE 1700, all from Dyneon LLC (Oakdale, Minn.); Teflon® PFA fluoropolymer grades 340, 345, 350, 440HP, 450HP available from DuPont (Wilmington, Del.); Teflon® FEP fluoropolymer grades 100, 140, 160, CJ-95N available from DuPont; Neoflon™ PFA fluoropolymer grade AP238SG, AP211SH, Neoflon™ FEP, and Neoflon™ ETFE fluoropolymer grades EP610 and EP620 available from Daikin Industries, Ltd. (Osaka, Japan); and copolymers of tetrafluoroethylene and perfluoromethylvinyl ether (MFA) available as Hyflon® MFA 620 and MFA 640 from Ausimont S.p.A. (Milan, Italy).

The hydrocarbon polymer in this invention comprises a non-fluorinated polymer whose backbone comprises carbon and hydrogen atoms. While hetero atoms such as nitrogen, oxygen, etc. may be present in limited amounts (e.g., less than about 5 wt %) the backbone preferably consists of only carbon and hydrogen. Examples of useful hdyrocarbon polymers include polyolefin, such as, for example, polyethylene and polypropylene, low-density polyethylene and high-density polyethylene, and blends of two or more of these. The preferred polyolefins are thermoplastic hydrocarbon polymers that are homopolymers of ethylene and propylene and copolymers of ethylene with 1-butene, 1-hexene, 1-octene, 4-methyl-1-pentene, or propylene. Commercially available hydrocarbon polymers which can be used in this invention include, for example, Escorene™ LL-1001.09, LL-3001.00, LL-5252.09, LD411.09, and LD760.36 polyethylenes, from Exxon Chem. Co.; ER1833 polyethylene from Chevron Chemical Co.; Novapol™ TF 0119F polyethylene from Novacor Chemicals Inc.; Dowlex™ 2047 polyethylene from Dow Chemical Co.; Marlex™ HMN 4550 polyethylene from Phillips 66 Co.; and 3374X polypropylene from Fina Oil and Chemical Co. Examples of other hydrocarbon polymers that may be useful in the present invention include polystyrene, polyisoprene, polyisobutylene, polybutadiene, polyvinyl acetate, and polyvinyl alcohol.

The hydrocarbon polymer and the fluoropolymer in the fluoropolymer compositions of the invention are immiscible. Generally, this can be shown by preparing a sample composition without the conductive filler (which typically imparts a color) and observing under an optical microscope, or by observing the cloudy, white, or opaque appearance of extrudates of the sample composition.

The particular blend components chosen can alter the particular amount of hydrocarbon polymer to be used, and simple sample extrusions can be run to determine that particular amount. The lower limit of amount of the hydrocarbon polymer to be blended with the fluoropolymer and conductive filler will generally be an amount at which a smaller decrease in melt flow index occurs in the blend, as compared to a blend of the same fluoropolymer and conductive filler that is not blended with the hydrocarbon polymer. Generally, the amount of the hydrocarbon polymer will be about 0.1 to about 10 wt %, more preferably about 0.5 to 4 wt % of the total blend including the fluoropolymer, the conductive filler, and the hydrocarbon polymer.

The conductive filler used in preparing the conductive fluoropolymer compositions of this invention can be any of those known materials added to resins to reduce resistivity or render the resin system more conductive. One such filler is carbon black particulate. Generally, the conductive carbon black particles to be used will have high surface area, e.g., greater than 150 $m^2/g$, high structure, e.g., dibutyl phthalate absorption (DBT) numbers preferably greater than 150, and low volatility, e.g., volatile contents of less than 2.5 wt %. Conductive grades of carbon black which can be used in this invention include super-conductive, extra-conductive, and P-type blacks with particle sizes ranging from 15 to 40 nm, nitrogen surface area of 40 to 1500 $m^2/g$, and densities of about 10 to 30 pounds per cubic feet (0.16 to 0.48 g/cc). Commercial conductive carbon black particulates which can be used in this invention include, for example, Ketjen™ EC-300JD and EC-600JD, Vulcan™ XC-72, and Printex™ XE-2. Another such conductive filler is graphite fibers.

The amount of conductive filler to be used in preparing the fluoropolymer compositions of this invention will be that amount sufficient to impart desired conductivity thereto and yet permit desired melt processing of the mixture. Generally, the conductive filler amount will be 1 to about 20 wt % (preferably about 4 to about 11 wt %) of the conductive fluoropolymer composition, with lower quantities generally providing higher resistivity in the final fluoropolymer. For a given level of conductive filler, the resistivity also depends upon the type and level of the hydrocarbon polymer.

The blends of fluoropolymer, hydrocarbon polymer, and conductive filler can be prepared by any suitable means. This includes, for example, blending means typically used in the plastics industry, such as using separate gravimetric feeders for each component to supply the selected ratio of components into a mixing unit. The mixing unit may in turn feed the mixture into an extruder, such as a reciprocating single screw extruder, or the mixing unit may itself be an extruder, preferably a twin screw extruder. A premix of at least two components (e.g., the hydrocarbon polymer and conductive filler) may also be prepared before feeding this premix to the extruder along with any other necessary component(s) (e.g., the fluoropolymer). In addition, a melt blended premix of one or more fluoropolymers and the hydrocarbon polymer may then be mixed with the conductive filler.

The ratio of components in the premix or other blend need not be within the final range desired. For example, a master batch of two components may be let down with a third component to reach an intermediate target composition or a final composition.

A uniform distribution of the components can provide lower resistivity at the same weight percent conductive filler than a less-uniform distribution. Thus, the mixing extruder preferably uniformly distributes the hydrocarbon polymer and conductive filler throughout the fluoropolymer. The mixing operation is conveniently carried out at a temperature above the melting point(s) of the polymers. The fluoropolymer and the hydrocarbon polymers may be used in any desirable form, e.g., powders, pellets, and granules.

In preparing shaped articles, such as film, tubing, or heat tracing cable, of the conductive fluoropolymer blend compositions of this invention, various extruders or other melt shaping equipment known in the art of polymer melt-processing can be used. Preferably the blend components can be melt blended in a mixing extruder and the mixture melt-processed therein, for example, at 200 to 400° C., depending upon the melting point, melt viscosity, and thermal stability of the blend, to produce extrudates or shaped articles.

The melt blended mixture of fluoropolymer, conductive filler, and hydrocarbon polymer also can be pelletized or comminuted into a desired particulate size and then fed to a melt processor, which will typically be an extruder, to melt-process the blended mixture. Different types of extruders which can be used to extrude the fluoropolymer compositions of this invention are described, for example, in "Polymer Extrusion" by C. Rauwendaal, Hansen Publishers, pages 23-48 (1986). The melt-processing equipment is preferably corrosion-protected.

The die design of the extruder can vary, depending on the extrudate desired. For example, an annular die is useful to extrude tubing, such as for fuel system hose or tubing such as that described in U.S. Pat. No. 5,284,184 (Noone et al.), the description of which is herein incorporated by reference.

The benefits of the present invention are achieved by using a wide variety of thermoplastic fluoropolymers. Thus, while a specific fluoropolymer may perform somewhat differently than another specific fluoropolymer, it is not critical to the present invention which thermoplastic fluoropolymer is used. It has been suggested that limiting the number of certain types of end groups on the fluoropolymer provides certain benefits. It has been discovered that this limitation is not important in the present invention. For example, the level of unstable end groups can be above 100 ppm in the thermoplastic fluoropolymer of the present invention.

Objects and advantages of this invention are further illustrated by the following examples, but the particular materials and amounts thereof recited in these examples, as well as other conditions and details, should not be construed to unduly limit this invention.

EXAMPLES

The following materials were used in the examples:

| | |
|---|---|
| FEP X 6307 | A thermoplastic fluoropolymer from Dyneon LLC, Oakdale, MN that was derived from a copolymerization of TFE and HFP, and had at least 100 unstable end groups per million carbon atoms. The melting point was 250° C., and the melt flow index at 372° C. and 5 kg was 16 g/10 min. |
| Vulcan ™ XC-72 | A carbon black from Cabot Corp., Houston, TX. |
| Printex ™ XE-2 | A carbon black from DeGussa-Hüls Corp., Ridgefield Park, NJ |
| Ketjen ™ EC 600 JD | A carbon black from Akzo Chem. Co., The Netherlands. |
| Escorene ™ LL-1001.09 | A polyethylene from Exxon Chem. Co., Houston, TX. |

Testing:

The Melt Flow Index (MFI) (or Melt Flow Rate (MFR)) was measured using the method described by ASTM D1238 at 5 kg and 372° C. It is reported in grams per 10 minutes. The specifications for FEP testing are given by ASTM D2116.

Volume Resistivity was measured using the method described by ASTM D957, and reported in ohm cm.

EXAMPLE 1

This example demonstrated high melt flow and low resistivity.

In Example 1, a blend of 89 wt % FEP X 6307, 9 wt % Vulcan™ XC-72, and 2 wt % Escorene™ LL-1001.09 was fed into a 30-mm twin screw extruder operating at 670 to about 700° F. (354 to 371° C.) and 88 rpm. The fluorothermoplastic blend was extruded into sample bars for testing.

The extruded material was substantially free of melt defects.

COMPARATIVE EXAMPLE 1 (CE 1)

A blend of 91 wt % FEP X 6307 and 9 wt % Vulcan™ XC-72 was mixed as in Example 1.

Example 1 showed much higher melt flow index and dramatically lower volume resistivity than CE 1.

EXAMPLE 2

This example also demonstrated the high melt flow and low resistivity advantages of the present invention.

Example 2 was made as Example 1, except that a blend of 92.5 wt % FEP X 6307, 5 wt % Printex™ XE-2, and 2.5 wt % Escorene™ LL-1001.09 was used and the extruder was maintained at 82 rpm.

The extruded material was substantially free of melt defects.

COMPARATIVE EXAMPLE 2

Comparative Example 2 (CE 2) was prepared as in Example 2, except that a blend of 95.5 wt % FEP X 6307 and 4.5 wt % Ketjen™ EC 600 JD was used. This carbon black is known in the art to provide somewhat more conductivity at similar loading levels as the Printex™ XE-2. Thus, this comparative example would be expected to have similar properties as an otherwise similar material that has a slightly higher loading of Printex™ XE-2.

The inventive material of Example 2 had much higher melt flow index, lower volume resistivity, and similar mechanical properties, as compared to CE2.

The following tables include compositions of each material and test results.

TABLE 1

| Compositions | | | | |
|---|---|---|---|---|
| | Example No.: | | | |
| | 1 | CE1 | 2 | CE2 |
| FEP X 6307 | 89 | 91 | 92.5 | 95.5 |
| Vulcan ™ XC-72 | 9 | 9 | | |
| Printex ™ XE-2 | | | 5 | |
| Ketjen ™ EC 600 JD | | | | 4.5 |
| Escorene ™ LL-1001.09 | 2 | | 2.5 | |

TABLE 2

| Test Results | | | | |
|---|---|---|---|---|
| | Example No. | | | |
| | 1 | CE1 | 2 | CE2 |
| Melt Flow Index (g/10 min; 372° C., 5 kg) | 7.98 | 1.97 | 4.91 | 0.24 |
| Volume Resistivity (ohm cm) | $2.3 \times 10^1$ | $1.03 \times 10^8$ | $5.6 \times 10^1$ | $2.4 \times 10^2$ |

These examples demonstrated the advantages of the present invention.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A melt-processable conductive fluorothermoplastic composition comprising:
   A) a major amount of at least one melt-processable, thermoplastic fluoropolymer having its interpolymerized units derived from (i) at least 50 weight percent (wt %) of tetrafluoroethylene (TFE), (ii) one or more ethylenically-unsaturated monomers represented by the formula
      (a) $CH_2$=$CR_2$, and, optionally, one or more ethylenically-unsaturated monomers represented by the formula
      (b) $CF_2$=CF—O—$R_f'$, and
      (c) $CF_2$=$CFR_f$,
   wherein $R_f$ is a perfluoroalkyl of 1 to 8 carbon atoms, $R_f'$ is $R_f$ or a perfluoroalkoxy of 1 to 8 carbon atoms, and R is selected from H, F, Cl, or an aliphatic group having from 1 to 8 carbon atoms which may have F or Cl substituents, provided that the thermoplastic fluoropolymer has less than 5 wt % of its interpolymerized units derived from vinylidene fluoride (VDF);
   B) from about 0.1 to about 4 weight percent of a hydrocarbon polymer having a weight average molecular weight of a least about 45,000; and
   C) from about 1 to about 20 weight percent of conductive filler.

2. The composition of claim 1 wherein the thermoplastic fluoropolymer has less than about 2 wt % of its interpolymerized units derived from VDF.

3. The composition of claim 1 wherein the thermoplastic fluoropolymer has interpolymerized units derived from TFE, at least one ethylenically-unsaturated monomer of the formula $CF_2$=CF—O—$R_f'$, and at least one ethylenically-unsaturated monomer of the formula $CF_2$=CF—$R_f$.

4. The composition of claim 1 wherein the thermoplastic fluoropolymer has interpolymerized units derived from 60 to 80 wt % TFE, about 10 to about 25 wt % of a monomer of the formula $CH_2$=$CR_2$, and optionally up to about 30 wt % of a monomer of the formula $CF_2$=CF—$R_f$, wherein $R_f$ is a perfluoroalkyl of 1 to 8 carbon atoms.

5. The composition of claim 1 wherein the thermoplastic fluoropolymer has interpolymerized units derived from TFE, at least one ethylenically-unsaturated monomer of the formula $CH_2=CR_2$, and at least one ethylenically-unsaturated monomer of the formula $CF_2=CF-R_f$, wherein $R_f$ is a perfluoroalkyl of 1 to 8 carbon atoms.

6. The composition of claim 1 containing from about 4 to about 11 wt % conductive filler.

7. The composition of claim 1 wherein the conductive filler is selected from carbon black and graphite.

8. The composition of claim 1 having a melt flow index greater than about 1 gram per 10 minutes.

9. The composition of claim 1 having a volume resistivity below about 100 ohm cm.

10. A shaped article comprising the composition of claim 1.

11. A melt-processable conductive fluorothermoplastic composition consisting essentially of:
   A) a major amount of at least one melt-processable, thermoplastic fluoropolymer having its interpolymerized units derived from (i) at least 50 wt % of TFE, and (ii) one or more ethylenically-unsaturated monomers represented by the formula
      (a) $CH_2=CR_2$, and, optionally, one or more ethylenically-unsaturated monomers represented by the formula
      (b) $CF_2=CF-O-R_f'$, and
   wherein $R_f'$ is a perfluoroalkyl of 1 to 8 carbon atoms or a perfluoroalkoxy of 1 to 8 carbon atoms, and R is selected from H, F, Cl, or an aliphatic group having from 1 to 8 carbon atoms which may have F or Cl substituents, provided that the thermoplastic fluoropolymer has less than 5 wt % of its interpolymerized units derived from VDF;
   B) from about 0.1 to about 4 weight percent of a hydrocarbon polymer having a weight average molecular weight of a least about 45,000; and
   C) from about 1 to about 20 weight percent of conductive filler.

12. A method of making a melt-processable conductive fluorothermoplastic composition comprising the steps of:
   A) providing a major amount of at least one melt-processable, thermoplastic fluoropolymer having its interpolymerized units derived from (i) at least 50 weight percent (wt %) of TFE, and (ii) one or more ethylenically-unsaturated monomers represented by the formula
      (a) $CH_2=CR_2$, and, optionally one or more ethylenically-unsaturated monomers represented by the formulas
      (b) $CF_2=CF-R_f$, and
      (c) $CF_2=CF-O-R_f'$,
   wherein $R_f$ is a perfluoroalkyl of 1 to 8 carbon atoms, $R_f'$ is $R_f$ or a perfluoroalkoxy of 1 to 8 carbon atoms, and R is selected from H, F, Cl, or an aliphatic group having from 1 to 8 carbon atoms which may have F or Cl substituents, provided that the thermoplastic fluoropolymer has less than 5 wt % of its interpolymerized units derived from VDF;
   B) providing from about 0.1 to about 10 weight percent of a hydrocarbon polymer having a weight average molecular weight of a least about 45,000;
   C) providing from about 1 to about 20 weight percent of conductive filler;
   D) mixing the materials of steps A through C in any order; and optionally
   E) melt processing the mixture.

13. The method of claim 12 wherein the materials of steps A and B are premixed before step C.

14. A method of improving volume resistivity of a melt-processable conductive fluorothermoplastic composition comprising the steps of claim 12.

15. A method of improving melt processability of a melt-processable conductive fluorothermoplastic composition comprising the steps of claim 12.

* * * * *

UNITED STATES PATENT AND TRADEMARK OFFICE
CERTIFICATE OF CORRECTION

PATENT NO. : 7,387,750 B2  Page 1 of 1
APPLICATION NO. : 10/987777
DATED : June 17, 2008
INVENTOR(S) : Attila Molnar It is certified that error appears in the above-identified patent and that said Letters Patent is hereby corrected as shown below:

Column 2
Line 63, delete "$R_f$(" and insert -- $R_f$'( --, therefor.

Column 4
Line 54, after "alcohol." insert -- Preferably, the hydrocarbon polymer has a weight average molecular weight of at least about 45,000. --.

Column 8
Line 48, in Claim 1, delete "a least" and insert -- at least --, therefor.

Column 9
Line 24, in Claim 11, delete "$R_f$', and" and insert -- $R_f$' --, therefor.
Line 33, in Claim 11, delete "a least" and insert -- at least --, therefor.

Column 10
Line 11, in Claim 12, delete "$R_f$" and insert -- $R_f$' --, therefor.
Line 12, in Claim 12, delete "$R_f$" and insert -- $R_f$' --, therefor.
Line 19, in Claim 12, delete "10" and insert -- 4 --, therefor.
Line 21, in Claim 12, delete "a least" and insert -- at least --, therefor.

Signed and Sealed this

Twenty-third Day of December, 2008

JON W. DUDAS
*Director of the United States Patent and Trademark Office*